Feb. 11, 1941.   P. S. DICKEY ET AL   2,231,567
RELAY
Filed July 2, 1938

Inventor
PAUL S. DICKEY
AND FRED E. WISE
By Raymond D. Jenkins
Attorney

UNITED STATES PATENT OFFICE 2,231,567

RELAY

Paul S. Dickey, Cleveland, and Fred E. Wise, Cleveland Heights, Ohio, assignors to Bailey Meter Company, a corporation of Delaware Application July 2, 1938, Serial No. 217,317

8 Claims. (Cl. 200—92)

This invention relates to relays and in particular to electric relays, wherein the relay is activated by changes in electrical conditions and for the purpose of controlling one or more electric circuits.

By the relay being activated, we mean that its condition is changed from a previous condition, and not necessarily that any part has been mechanically or electrically moved. The referred to change or changes in electrical condition which may cause an activation may be the energizing or deenergizing of a winding or similar action or effect.

By the controlling of an electric circuit we mean the completing of a circuit, or the breaking of a circuit, as for instance by the closing or opening of a switch instrumentality.

Electric relays of the solenoid actuated type are well known, wherein the energizing or deenergizing of an electromagnetic winding mechanically causes one or more switch members to be changed in position, with a resulting control of electric circuits. Such relays have very definite limitations. Mechanically they break down after a limited number of actuations. Electrically a substantial voltage and current is necessary for their actuation. Unless rather complicated arrangements are used, they are not adapted for differential action, and in particular they are not adapted to distinguish as to desired variable time lengths of actuation. In all of these regards our preferred form of relay has numerous advantages.

Figure 1:
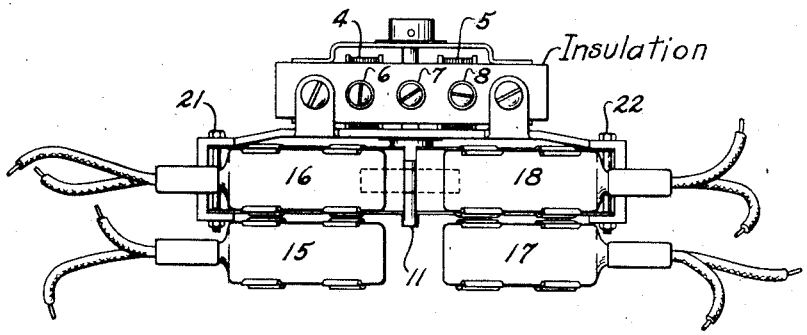
Fig. 1 is a plan view of a preferred embodiment of our invention.

Referring now to the drawing, we will describe in connection therewith a preferred embodiment of our invention. A motor generally indicated at 1 is provided with suitable laminations 2, a field coil 3, and a pair of shading coils 4, 5. The wiring diagram illustrated in Fig. 3, taken in connection with the plan and elevation of Figs. 1 and 2, clearly indicates the electrical interconnection and arrangement of the coils 3, 4, 5. On the motor assembly (Fig. 1) the terminals 6, 7, 8 are joined to the shading coils 4, 5 as illustrated in Fig. 3. The terminals of the field coil 3 are indicated at 9 and 10. The preferred motor is a synchronous alternating current torque motor, adapted for continuous or intermittent rotation in either direction through the control of energization of the shading coils 4, 5. The motor is self-starting and is of a type wherein the field coil 3, or the shading coils 4, 5 may individually or collectively remain energized, with or without rotation of the rotor 11, without damage to the various parts of the motor.

Rotation of the rotor 11 and in desired direction is controlled through the energization of the shading coils 4, 5. If the shading coils are either simultaneously deenergized or simultaneously energized, then the rotor 11 is not urged to rotation in either direction. If, however, just one of the shading coils is energized, then the rotor 11 is urged to rotation in one direction or the other, depending upon which of the two shading coils is energized and which is deenergized.

Referring to Fig. 3, it will be observed that the field coil 3 is connected directly across a source of alternating current. Obviously, a disconnecting switch may be inserted to completely break or make circuit. The shading coils 4, 5 are connected in independent loop circuit selectively by switch members 12, 13.

Assuming that the field winding 3 is energized across the alternating current source, then if the switch member 12 is close circuited with the wire 9', the shading coil 4 is energized, while the shading coil 5 is not energized, and the rotor 11 will be urged to rotation in one direction. Conversely, if the switch member 13 closes circuit with the wire 9', then the shading coil 5 is energized and the rotor 11 is urged to rotation in the opposite direction. If neither the switch member 12 nor the switch member 13 is closed with the wire 9', then neither of the shading coils 4, 5 is energized and the rotor 11 is not urged to rotation in either direction. Likewise, if both the switch members 12, 13 are close circuited with the wire 9', then both shading coils 4, 5 are energized and the opposing energization balances out and there is no urge to rotation for the rotor 11.

It will be apparent that control of direction of rotation of the rotor 11 may then be had by selectively energizing either the shading coil 4 or the shading coil 5. Likewise, if the two shading coils are both energized or both deenergized, but for unequal lengths of time, there will be a rotation of the rotor 11 in one direction or the other dependent upon the overlap of energization of the coils 4, 5 and for a period of time determined by the extent of such overlap.

For example, (referring to Fig. 3), if the switch members 12, 13 are simultaneously closed to the wire 9', but thereafter the switch member 12 is disconnected prior to the disconnecting of the switch member 13, it will be seen that the switch member 13 closes circuit for the winding 5 after the winding 4 is deenergized. Thus, while the two windings 4, 5 were simultaneously energized, the rotor 11 was not urged to rotation. During that period of time when the winding 5 remained energized, the rotor 11 was caused thereby to rotate in predetermined direction and for so long as the winding 5 remained energized following the deenergizing of the winding 4. Conversely, if the switch member 13 had been disconnected earlier than the switch member 12, then the winding 4 would have remained energized longer than the winding 5 and the rotor would have been urged to rotate in the opposite direction for a length of time dependent upon the overlap in energization between the time energization of the windings 4 and 5.

A similar action and result is obtained if one of the switch members 12 or 13 is close circuited prior to the other, but the two are disconnected simultaneously. Here again the direction of rotation is controlled accordingly, as to whether the switch member 12 or 13 were the first to be close circuited and the duration of rotation is then controlled by the length of time during which only one of the switch members is close circuited.

We have provided a relay selective as to directional action, as well as to the time length of such actuation. Thus it becomes differential in function in that it is receptive to simultaneous electrical impulses for motivation in opposite direction and in effect algebraically adds these electrical impulses to produce an actuation in direction and time duration dependent upon the overlap of the opposing impulses, or actually the algebraic sum of the impulses.

It is immaterial just what causes a movement of the switch members 12, 13. These may be positioned manually or may be positioned by a contactor, in turn responsive to some variable, such as steam pressure, steam temperature, rate of flow, etc. The present relay is particularly advantageous in connection with such a contactor adapted to simultaneously originate impulses of opposite sense and for varying durations. While it may readily be utilized on a control system wherein an impulse in one direction or the other may be made alternatively or simultaneously, it is of primary importance in those systems wherein it is desired to algebraically add impulses of opposite sense and varying duration, some part of the impulses being simultaneous, so that there is an overlap either at the beginning or at the end, and which overlap determines not only the direction but the degree of actuation.

Figure 2:
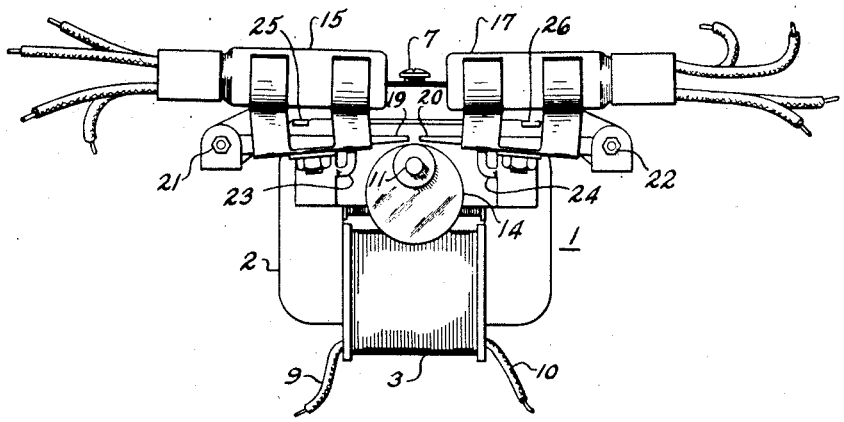
Fig. 2 is an elevation of the relay of Fig. 1.
Figures 3, 4:
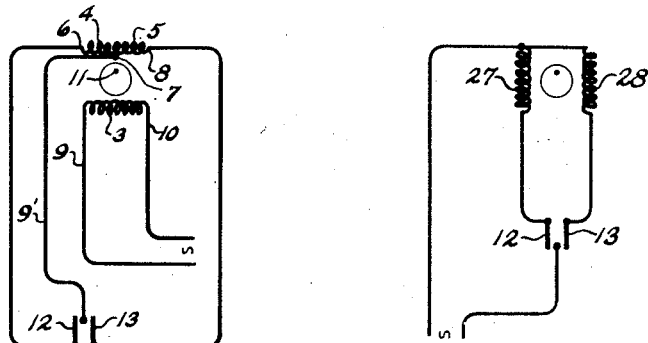
Fig. 3 is a wiring diagram of the relay of Figs. 1 and 2.
Fig. 4 is a wiring diagram of a second embodiment of our invention.

In the particular embodiment illustrated in Figs. 1 and 2, we show an eccentric or cam 14 rigidly mounted on the shaft 11. The eccentric or cam 14 is urged to rotation in one direction or the other dependent upon the energization of the shading coils 4, 5.

Inasmuch as the preferred purpose of the present relay is for the positioning of switch members to control one or more electric circuits, we have illustrated in Figs. 1 and 2 such switch members as mercury switches 15, 16, 17 and 18. These mercury switches are mounted in suitable clips upon leaves 19 and 20, pivoted respectively at 21 and 22. The arrangement is by no means limited to the number of mercury switches illustrated, nor in fact is it limited to the use of mercury switches per se. It is possible that only a single switch member might be used on the leaf 19 and none at all on the leaf 20, or vice versa. Also there might be more than two switch members moved with each of the leaves 19 or 20, the total number dependent upon the power available in the motor 1. It will be observed, however, that in the illustration being described the switch members 15, 16 are simultaneously moved with the leaf 19, while the switch members 17, 18 are simultaneously moved with the leaf 20. Obviously, the switches in each pair, as for example, 15 and 16 need not both be close circuited or open circuited, for by reversing one of the mercury switches then one may be normally close circuited and the other normally open circuited.

While the invention is by no means to be limited to the use of mercury switches, these are however preferred, as they normally are capable of a greater voltage and current condition than would open contacts of platinum, carbon, or other material. In other words, considering the relay assembly as a whole, the voltage and current requirements for urging the rotor 11 to rotation in one direction or the other are insignificant in comparison to the voltage and current which may be controlled in the mercury switches. Thus the arrangement is not only of a differential selective nature, but is an amplifier of great magnitude in regard to electrical conditions being controlled by the relay. In the motor or actuating mechanism for the switches there are no wearing parts other than the rotor 11 and such a motor is known to have great life as compared to the ordinary type of solenoid or electromagnetic relay with its large number of mechanically movable and other wearing parts. Furthermore, one or more switch members may be utilized, each having far greater durable life than the open contacts normally used with a solenoid type of relay.

In order to prevent an inhibiting starting torque on the rotor 11, the free ends of the leaves 19, 20 do not rest on the periphery of the cam 14 in normal condition, as is clearly shown in Fig. 2. Stops 23, 24 are provided as extensions of the motor framework and are so arranged that the leaves 19 and 20 come to rest against said stops rather than against any part of the rotor 11 or the cam 14. Thus, the rotor 11 is free of any load of the leaves 19, 20 and the parts carried thereby until the rotor is urged to rotation and the cam 14 engages the end of the leaf 19 or the end of the leaf 20, dependent upon the direction of rotation. Immediately upon such engagement the leaf 19 or the leaf 20 is moved angularly around a pivot 21 or 22 respectively in counterclockwise or clockwise rotation, and by an angular amount limited by the stops 25, 26 fixed to the frame of the motor. When, for example, the stop 25 is engaged by the free end of the leaf 19 moving in counterclockwise rotation, through clockwise rotation of the cam 14, then further rotation or angular movement of the rotor 11 is stopped. However, no damage is caused to the motor and this stalled condition of the rotor may persist until equal energization or non-energization of both shading coils 4 and 5 is next accomplished whereafter the cam will freely fall through gravity to its lowermost position as shown in Fig. 2. The engagement and angular moving of the leaf 19 or of the leaf 20 is selective as to whether the cam 14 is urged into angular movement in one direction or the other, and this in turn is selective as to the energization of the shading coils 4, 5.

The actual angular motion of the cam 14 may be in the nature of 90 degrees in either direction from a position of original rest. This, however, is not a definite limitation, but is predicated more or less upon the particular type of mercury switch or other switch member which is to be actuated or positioned. The return of the cam to its original position may be by gravity or hastened through the use of a spring.

It will be clear that we are not necessarily limited to the particular type of electric motor disclosed, and so far described. For example, in Fig. 4 we illustrate the wiring diagram of a self-starting synchronous alternating current motor having normally deenergized opposing fields 27, 28. If the fields 27, 28 are deenergized, or are simultaneously energized, then the rotor of the motor is not urged to rotation. If one field only is energized, then rotation occurs in predetermined direction and to an extent determined by the length of time that the field is energized relative to the energization of the other field. If the switch members 12, 13 of Fig. 4 are closed to the power source simultaneously, but one is opened ahead of the other, then rotation of the rotor occurs in direction and extent determined by the overlap of energization of the windings 27, 28.

In general, if the opposing windings of the relay motor are energized by periodic impulses, or circuit closures, then if the impulses are of identical duration the switch members, such for example as the mercury switches 15, 16, 17, 18 are not moved and no change in condition is effected of the circuits under the control of said switch members. If the impulses originate simultaneously, but are of different duration, or if they originate at different times but terminate simultaneously, then the overlap of the two impulses will cause a rotation of the rotor in one direction or the other in amount dependent upon the length of overlap on a time basis. Thus we have provided a relay mechanism selective as to the switch members which it positions and differential in respect to algebraically adding impulses of opposite sense and varying time duration.

While we have chosen to illustrate and describe preferred embodiments of our invention, it will be understood that the principle thereof may be embodied in other arrangements and that we are not to be limited except as to the claims in view of prior art.

What we claim as new, and desire to secure by Letters Patent of the United States, is:

1. A relay comprising in combination, a motor having opposed windings whereby if said windings are simultaneously energized or deenergized the rotor is not urged to rotation and if either alone is energized said motor is effectively energized and said rotor is urged to rotation in predetermined direction, a freely rotating cam on and positioned by said rotor, a freely rotatable switch member positioned by said cam, and a travel limit for limiting the travel of said switch member to less than the rise of said cam so that said switch member is forcibly urged against said travel limit for the duration of the effective energization of said motor.

2. A relay mechanism comprising a motor having a continuously energized alternating current field winding, a rotor, and a wire wound shading coil which when short circuited urges said rotor to rotation, a cam mounted on said rotor, said cam and rotor freely rotatable, a pivotally supported freely rotating cam follower, a stop against which said follower normally rests, a second stop limiting the cam follower's rotation, said cam adapted upon short circuiting of said winding to angularly move said follower until said follower engages said second stop when said motor is stalled and said follower remains in forcible engagement with said second stop until said winding is deenergized, when said follower returns by gravity to its normal position, and a mercury switch mounted upon said follower arranged to perform a circuit controlling operation upon positioning of said follower from the first to the second stop, or vice versa.

3. A relay comprising a freely movable switch member, a stop against which said switch normally rests, a second stop for said switch member, and means for moving said switch member to said second stop and forcibly holding said switch member against said second stop for predetermined increments of time comprising a cam whose normal rest position is gravity determined and having a throw greater than the distance between said first and second stops, a motor for rotating said cam having a continuously energized alternating current field winding, a wire wound shading coil, a freely rotating rotor on which said cam is mounted, short circuiting of said shading coil urges said rotor to rotation so that said cam positions said switch member to said second stop, and upon said switch member engaging said second stop said motor is stalled and said switch member is forcibly held against said second stop for the duration of the short circuiting of said shading coil.

4. A relay comprising a movable switch member, a stop against which said switch member normally rests, a second stop for said switch member and means for moving said switch member to said second stop and forcibly holding said switch member against said second stop for predetermined increments of time comprising a motor having a rotor, a cam on said rotor, arranged to position said switch member from said first to said second stop upon energization of said motor, said cam having a rise greater than the distance between said first and second stops so that upon said switch member engaging said second stop said motor is stalled and said switch member is forcibly held against said second stop for the duration of the energization of said motor.

5. A relay comprising a freely movable switch member, a stop against which said switch member normally rests, a second stop for said switch member, a cam for positioning said switch from said first to said second stop so that said switch member performs a circuit controlling operation, and freely rotatable means for oscillating said cam to cause said switch member to remain at said second stop for predetermined increments of time comprising a motor having a continuously energized alternating current field winding, a wire wound shading coil and a rotor on which said cam is mounted, short circuiting of said shading coil urging said rotor to rotation so that said cam positions said switch member to said second stop for the duraton of the short circuiting of the shading coil.

6. A relay comprising a motor having a rotor and opposed windings whereby if said windings are simultaneously energized or deenergized said rotor is not urged to rotation and if either of said windings alone is energized said rotor is urged to rotation in predetermined direction, a cam mounted on said rotor, a first and second switch member each having definite travel limits, said cam upon rotation in one direction causing said first switch member to be positioned and upon rotation in opposite direction causing the other switch member to be positioned, the throw of said cam being greater than the distance between said travel limits so that upon either of said switch members reaching a travel limit said motor is stalled and said switch member is forcibly urged against the said travel limit while said motor is effectively energized.

7. The combination with a reversible motor having wire wound shading coils, a rotor, a cam on said rotor, said cam rotating freely with said rotor, upon energization of either winding and gravitationally returning said rotor to an initial position upon deenergization, freely angularly movable switch members pivotally mounted to the frame of said motor, rests for said switch members, angular movement determining stops for said switch members, and said switch members angularly moved from their position of rest to the angular movement determining stops upon rotation of said rotor in predetermined direction.

8. The combination with a reversible motor having two wire wound shading coils, a rotor, a cam on said rotor, said cam rotating freely with said rotor, upon energization of either winding and gravitationally returning said rotor to an initial position upon deenergization, freely angularly movable switch carrying members pivotally mounted to the frame of said motor and adjacent said cam, angular movement limiting stops for said switch carrying members, and said switch carrying members upward positions determined and maintained by said cam for the duration of short circuiting of either of the shading coils.

PAUL S. DICKEY.
FRED E. WISE.